(12) United States Patent
Kusumoto et al.

(10) Patent No.: US 6,613,477 B2
(45) Date of Patent: Sep. 2, 2003

(54) LITHIUM SECONDARY BATTERY

(75) Inventors: Yasuyuki Kusumoto, Moriguchi (JP); Masahisa Fujimoto, Osaka (JP); Hiroaki Ikeda, Hyogo (JP); Shin Fujitani, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 146 days.

(21) Appl. No.: 09/789,004

(22) Filed: Feb. 21, 2001

(65) Prior Publication Data

US 2003/0054252 A1 Mar. 20, 2003

(30) Foreign Application Priority Data

Feb. 22, 2000 (JP) .......................... 2000-044702

(51) Int. Cl.[7] .................. H01M 4/58; H01M 10/44; H01M 4/88
(52) U.S. Cl. ................ 429/231.95; 429/218.1; 205/59; 252/182.1
(58) Field of Search .................... 429/231.95, 231.9, 429/218.1; 252/182.1; 428/544, 615; 205/59

(56) References Cited

U.S. PATENT DOCUMENTS

| 4,645,726 A | 2/1987 | Hiratani et al. ............. 429/304 |
| RE35,818 E * | 6/1998 | Tahara et al. ............... 429/218 |
| 6,322,930 B1 * | 11/2001 | Yoshimura et al. ........ 429/341 |

FOREIGN PATENT DOCUMENTS

| JP | 62-223969 | 1/1987 | |
| JP | 63-166166 * | 7/1988 | .......... H01M/10/40 |
| JP | 6-168721 | 6/1994 | |
| JP | 11-54117 * | 2/1999 | ............ H01M/4/02 |

OTHER PUBLICATIONS

Besenhard, J. O. et al.; "Reversibles Elektrochemisches Legieren von Metallen der V. Hauptgruppe in Organischen Li[+]–Lösungen"; *Electrochimica Acta*; vol. 20, pp. 513–517; 1975, No Month available.

Chemical Abstracts, No. 83(18)154522x; "Reversible Electrochemical Alloying of Group V Metals in Orgaic Solutions Containing Lithium (1+)", No date available.

Demidov, A. I. et al.; "Alloy Formation During Lithium Deposition on Antimony and Bismuth Cathodes"; *Elektrokhimiya*; vol. 19, pp. 1695–1699; 1983, No month available.

Chemical Abstracts, No. 100(8)58704g; "Alloy Formation During Lithium Deposition on Antimony Bismuth Cathodes", No date available.

Wang, J. et al.; "Behavior of Some Binary Lithium Alloys as Negative Electrodes in Organic Solvent–Based Electrolytes"; *Journal of the Electrochemical Society: Electrochemical Science and Technology*; vol. 133, No. 3, pp. 457–460; Mar. 1986.

* cited by examiner

*Primary Examiner*—Stephen Kalafut
*Assistant Examiner*—Raymond Alejandro
(74) *Attorney, Agent, or Firm*—Kubovcik & Kubovcik

(57) ABSTRACT

The present invention provides a lithium secondary battery having great capacity density per volume and weight. The lithium secondary battery contains a positive electrode having Li—Bi alloy or Li—Sb alloy as a positive electrode active material, a negative electrode and a non-aqueous electrolyte.

15 Claims, 1 Drawing Sheet

LITHIUM SECONDARY BATTERY

FIELD OF THE INVENTION

The present invention relates to a lithium secondary battery having a positive electrode, a negative electrode and a non-aqueous electrolyte.

BACKGROUND OF THE INVENTION

A secondary battery, especially, a lithium secondary battery has lately been attracting attention as an operating power source for portable electronic equipment that can be miniaturized, is highly efficient and is cordless. A lithium secondary battery contains a positive electrode having a positive electrode active material, a negative electrode having a negative electrode active material and a non-aqueous electrolyte.

The most common and practical lithium secondary battery has a carbon material, for example, graphite or the like, as a negative electrode active material, and crystalline $LiCoO_2$ as a positive electrode active material. A lithium secondary battery having a high voltage, i.e., 4V, and high energy density can be provided because crystalline $LiCoO_2$ has a high voltage level.

However, reduction of consumption of power has been recently required for electronic equipment. Operating voltages of electric circuits have been gradually reduced. Therefore, a lithium battery having high discharge capacity density is required more than one having a high discharge voltage.

OBJECT OF THE INVENTION

An object of the present invention is to provide a lithium secondary battery which has higher capacity density per volume and per weight.

SUMMARY OF THE INVENTION

The present invention provides a lithium secondary battery having positive and negative electrodes and a non-aqueous electrolyte, wherein the positive electrode contains Li—Bi alloy or Li—Sb alloy as an active material.

Figure 1:
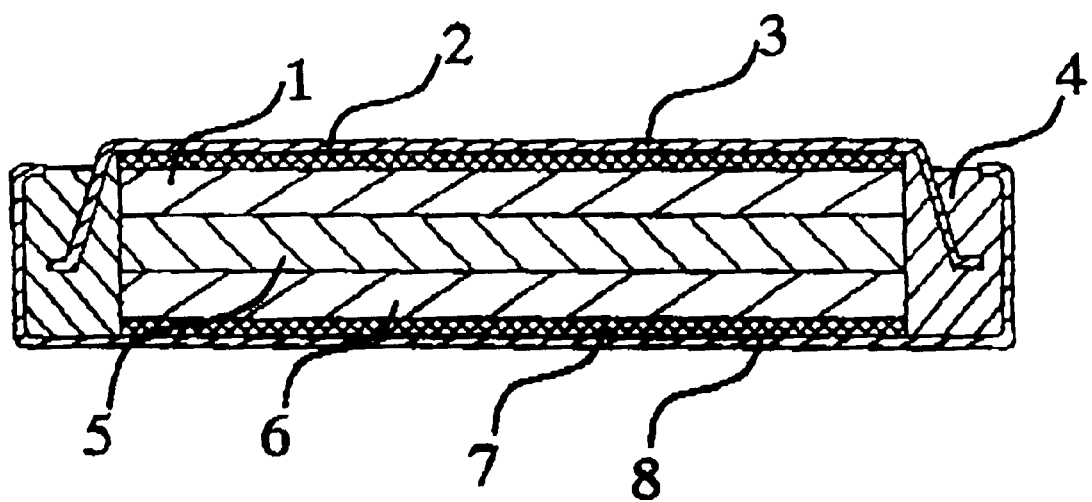
FIG. 1 is a cross section of a coin-shaped lithium secondary battery of the present invention.

| | |
|---|---|
| 1: | a negative electrode |
| 2: | a negative electrode collector |
| 3: | a negative can |
| 4: | a insulation packing |
| 5: | a separator |
| 6: | a positive electrode |
| 7: | a positive electrode collector |
| 8: | a positive can |

Since Li—Bi alloy or Li—Sb alloy having a large theoretical capacity density is used as a positive electrode active material in the present invention, a large amount of lithium can be occluded and discharged. Therefore, it is possible to increase a capacity density per volume and per weight.

When $LiCoO_2$ is used as a positive electrode active material, only 50% of the lithium content can be released because the $LiCoO_2$ maintains its original crystal structure. Lithium that does not participate in the charge-discharge reaction is included in the active material. However, almost all of the lithium content can be used for the charge-discharge reaction in the present invention.

Furthermore, a capacity of a negative electrode is required to be large enough in case an excessive amount of lithium is released from the positive electrode because as explained above an excessive amount of lithium is included in the positive electrode of a conventional battery having $LiCoO_2$ as the positive electrode active material. However, it is possible that the capacity of a negative electrode is nearly equal to that of a positive electrode in the present invention. Use of an excessive amount of a negative electrode active material can be avoided because almost all lithium can be expected to be released.

As an active positive electrode material, there can be used a Li—Bi or Li—Sb alloy in which lithium is added to a Bi or Sb thin film formed on a positive electrode collector. There is no limitation with respect to a method to add lithium to prepare the Li—Bi or Li—Sb alloy. An electrochemical method is preferably used. For example, if a negative electrode active material contains releasable lithium, lithium can be added to a Bi or Sb film by a discharge reaction after a battery is assembled using a Bi or Sb film. A lithium film is placed on a Bi or Sb film and is dipped into a non-aqueous electrolyte including lithium ion to electrochemically add Li into the Bi or Sb film. It is preferable to cool off the system because this reaction generates heat.

There is no limitation of a method for forming a Bi or Sb film on an electrode collector. Sputtering, CVD, flame spray coating, and the like can be used. There is also no limitation with respect to the electrode collector. The collector can be a metal film, for example, a copper film, nickel film or the like. When a copper film is used, an electrolytic copper film that has a large surface roughness (Ra) is preferable.

The Bi or Sb film is preferably amorphous. An amorphous film can ease expansion and contraction when lithium ion is occluded and is discharged. It also can inhibit reduction of a positive electrode active material to a fine powder, and to improve charge-discharge characteristics.

It is preferable that the negative electrode contains Li—Si alloy or Li—Ge alloy as an active material. These alloys have greater theoretical capacity compared to carbon materials conventionally used as the active material. These materials make it possible to increase capacity density per volume and weight.

Li—Si alloy and Li—Ge alloy are preferably formed by adding Li into a Si film or Ge film formed on an electrode collector. Lithium can be added electrochemically into the Si film or Ge film. For example, a lithium film is placed on a Si film or Ge film and is dipped into a non-aqueous electrolyte including lithium ion and left for about ten days in the electrolyte. It is also possible to add Li to the Si film or Ge film by applying voltage to a negative electrode of a Si film or Ge film and a positive electrode of lithium metal.

Addition of lithium to the negative electrode active material is preferably done prior to assembly of a battery if the positive electrode active material does not include lithium. There is no limitation as to the method of forming a Si or Ge film on an electrode collector. Sputtering, CVD, flame spray coating, and the like can be used. There is no limitation with respect to the electrode collector. A metal film, for example, a copper film or the like, is preferable. An electrolytic copper film that has a large surface roughness (Ra) is especially preferable.

The Si film is preferably amorphous or finely crystalline. An amorphous Si film is one in which a peak around 480 cm$^{-1}$ corresponding to an amorphous area is substantially detected by Raman spectroscopic analysis and a peak around 520 cm$^{-1}$ corresponding to a crystalline area is not substantially detected. A finely crystalline Si film is one in which a peak around 480 cm$^{-1}$ corresponding to an amorphous area is substantially detected by Raman spectroscopic analysis and a peak around 520 cm$^{-1}$ corresponding to a crystalline area is substantially detected.

The Ge film is also preferably amorphous. An amorphous Si or Ge film can ease expansion and contraction when lithium ion is occluded and is discharged. It also can inhibit reduction of a negative electrode active material to fine powder, and improve charge-discharge characteristics.

The Li—Bi alloy, Li—Sb alloy, Li—Si alloy and Li—Ge alloy can include other elements. As other elements, a transition metal element included in Group IV of the periodic table, Sc, Ti, V, Mn, Fe, Co, Ni, Cu, Zn, and the like, can be exemplified. The Bi, Sb, Si and Ge films also can include such other elements.

A preferable embodiment of the present invention consists of a positive electrode which is a Bi or Sb film formed on an electrode collector, a negative electrode which is a Si or Ge film formed on an electrode collector, Li being added to one of the electrodes, i.e., the positive or negative electrode, prior to assembly of the battery. When Li is inserted to the negative electrode, a battery is a secondary battery that can discharge at the beginning, and when Li is inserted to the positive electrode, a battery is a secondary battery that can discharge after charge.

The following are theoretical capacity densities per volume and weight of each active material and of a secondary battery comprising various combinations of active material.

A capacity of 1 mol of Li is obtained as follows:

(Charge per electron)×(Avogadro constant)

Charge per electron: −4.8029×10$^{-10}$ esu=1.602×10$^{-19}$C

1C=1A·s=1/3600Ah

Avogadro constant: 6.0221367×10$^{23}$ mol$^{-1}$

Capacity of 1 mol of Li
= 1.602×10$^{-19}$÷3600×6.0221367×10$^{23}$
= 26.8Ah

Therefore, the capacity of 1 mol of Li is 26.8Ah.

When a Li—Bi alloy occludes Li until its composition becomes Li$_3$Bi, theoretical capacity density (weight capacity density) per weight and theoretical capacity density (volume capacity density) per volume are shown in Table 1. "Q" and "L" in the table mean Faraday's constant and liter, respectively.

TABLE 1

| Li$_3$Bi | | |
|---|---|---|
| Number of mols of Li to Bi | a | 3 |
| Atomic weight of Bi | b | 208.98 |
| Density of Bi | c | 9.8 g/cm$^3$ |
| Li capacity per mol | Q · a | 80.4 Ah |
| Li volume per mol | b/c | 21.324 cm$^3$ |
| Weight capacity density | (Q · a)/b | 0.3847 Ah/g = 385 Ah/Kg |
| Volume capacity density | Q/(b/c) | 3.7703 Ah/cm$^3$ = 3770 Ah/L |

When Li—Sb alloy occludes Li until its composition becomes Li$_3$Sb, theoretical capacity density (weight capacity density) per weight and theoretical capacity density (volume capacity density) per volume are shown in Table 2.

TABLE 2

| Li$_3$Sb | | |
|---|---|---|
| Number of mols of Li to Sb | a | 3 |
| Atomic weight of Sb | b | 121.75 |
| Density of Sb | c | 6.62 g/cm$^3$ |
| Li capacity per mol | Q · a | 80.4 Ah |
| Li volume per mol | b/c | 18.391 cm$^3$ |
| Weight capacity density | (Q · a)/b | 0.6604 Ah/g = 660 Ah/Kg |
| Volume capacity density | Q/(b/c) | 4.3716 Ah/cm$^3$ = 4372 Ah/L |

When LiCoO$_2$ occludes and discharge 50% of included Li, theoretical capacity density (weight capacity density) per weight and theoretical capacity density (volume capacity density) per volume are shown in Table 3.

TABLE 3

| LiCoO$_2$ | | |
|---|---|---|
| Weight capacity density | (Q · a)/b | 0.15 Ah/g = 150 Ah/Kg |
| Volume capacity density | Q/(b/c) | 0.45 Ah/cm$^3$ = 450 Ah/L |

When Li—Si alloy occludes Li until its composition becomes Li$_{22}$Si$_5$, theoretical capacity density (weight capacity density) per weight and theoretical capacity density (volume capacity density) are shown in Table 4.

TABLE 4

| Li$_{22}$Si$_5$ | | |
|---|---|---|
| Number of mols of Li to Si | a | 4.4 |
| Atomic weight of Si | b | 28.086 |
| Density of Si | c | 2.33 g/cm$^3$ |
| Li capacity per mol | Q · a | 117.92 Ah |
| Li volume per mol | b/c | 12.054 cm$^3$ |
| Weight capacity density | (Q · a)/b | 4.1985 Ah/g = 4199 Ah/Kg |
| Volume capacity density | Q/(b/c) | 9.7826 Ah/cm$^3$ = 9783 Ah/L |

When Li—Ge alloy occludes Li until its composition becomes Li$_{22}$Ge$_5$, theoretical capacity density (weight capacity density) per weight and theoretical capacity density (volume capacity density) per volume are shown in Table 5.

TABLE 5

| Li$_{22}$Ge$_5$ | | |
|---|---|---|
| Number of mols of Li to Ge | a | 4.4 |
| Atomic weight of Ge | b | 72.59 |
| Density of Ge | c | 5.32 g/cm$^3$ |
| Li capacity per mol | Q · a | 117.92 Ah |
| Li volume per mol | b/c | 13.645 cm$^3$ |
| Weight capacity density | (Q · a)/b | 1.6245 Ah/g = 1624 Ah/Kg |
| Volume capacity density | Q/(b/c) | 8.6422 Ah/cm$^3$ = 8642 Ah/L |

When carbon material like graphite occludes Li until its composition becomes LiC$_6$, theoretical capacity density (weight capacity density) per weight and theoretical capacity density (volume capacity density) per volume are shown in Table 6.

TABLE 6

| | | $LiC_6$ |
|---|---|---|
| Number of mols of Li to C | a | 0.1677 |
| Atomic weight of C | b | 12.012 |
| Density of C | c | 2.26 g/cm$^3$ |
| Li capacity per mol | Q · a | 4.4667 Ah |
| Li volume per mol | b/c | 5.3148 cm$^3$ |
| Weight capacity density | (Q · a)/b | 0.3719 Ah/g = 372 Ah/Kg |
| Volume capacity density | Q/(b/c) | 0.8404 Ah/cm$^3$ = 840 Ah/L |

A theoretical capacity density per weight or per volume of a secondary battery prepared by a different combination of active materials can be calculated by the following equation.

A theoretical capacity density of a secondary battery per weight=weight capacity density of a positive electrode×weight capacity density of a negative electrode÷(weight capacity density of a positive electrode+weight capacity density of a negative electrode)

A theoretical capacity density of a secondary battery per volume=volume capacity density of a positive electrode×volume capacity density of a negative electrode÷(volume capacity density of a positive electrode+volume capacity density of a negative electrode)

A theoretical capacity density per weight (Ah/Kg) of a secondary battery prepared by a different combination of active materials calculated by the equation explained above is shown in Table 7.

TABLE 7

| Positive | Negative Electrode | | |
|---|---|---|---|
| Electrode | Li—Si | Li—Ge | $LiC_6$ |
| Li—Bi | 352 | 311 | 189 |
| Li—Sb | 571 | 470 | 238 |
| $LiCoO_2$ | 145 | 137 | 107 |

A theoretical capacity density per volume (Ah/L) of a secondary battery prepared by a different combination of active materials calculated by the equation explained above is shown in Table 8.

TABLE 8

| Positive | Negative Electrode | | |
|---|---|---|---|
| Electrode | Li—Si | Li—Ge | $LiC_6$ |
| Li—Bi | 2721 | 1135 | 687 |
| Li—Sb | 3021 | 1184 | 705 |
| $LiCoO_2$ | 430 | 352 | 293 |

It is clear that a secondary battery containing Li—Bi alloy or Li—Sb alloy as a positive electrode active material has greater capacity density per volume and per weight compared to the conventional secondary battery containing $LiCoO_2$ as a positive electrode active material as shown in Tables 7 and 8. Especially, a secondary battery having Li—Si alloy or Li—Ge alloy as a negative electrode active material has better capacity density per volume and per weight.

As a solvent of the non-aqueous electrolyte, there is no limitation. A cyclic carbonate, for example, ethylene carbonate (EC), propylene carbonate, butylene carbonate, and the like, or a chain carbonate, for example, dimethyl carbonate, ethyl methyl carbonate (EMC), diethyl carbonate (DEC), and the like, can be used alone or in the form of a mixture of two or more of these substances. A mixture of the cyclic carbonate and ether, for example 1,2-dimethoxyethane, 1,2-diethoxyethane, and the like, can also be used.

As a solute dissolved in the electrolyte there can be mentioned $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, and the like, or a mixture of two or more of these substances.

As the electrolyte, there can be mentioned a gel polymer electrolyte, for example, an electrolyte impregnated in a solute of polyethylene oxide, polyacrylonitrile, and the like, or an inorganic solid electrolyte, for example, LiI, $Li_3N$. There is no limitation as to an electrolyte for the lithium secondary battery of the present invention if the Li compound acts as a solute which supports ionic conductivity and the solvent dissolves the Li compound, and decomposition of the electrolyte during charge or discharge or during storage does not occur.

DESCRIPTION OF PREFERRED EMBODIMENT

The present invention is described below in detail in conjunction with certain examples. However, it is of course understood that the present invention is not limited to the following examples. The present invention can be modified within the scope and spirit of the appended claims.

FIG. 1 is a sectional view of an embodiment of a lithium secondary battery of the present invention. The lithium secondary battery contains a negative electrode (1), a negative electrode collector (2), a negative can (3), an insulating packing (4), a separator (5), a positive electrode (6), a positive electrode collector (7) and a positive can (8).

The separator (5) is located between the negative electrode (1) and the positive electrode (6) that face each other. They are placed in a battery case formed by the negative can (3) and the positive can (8). The separator is impregnated with a non-aqueous electrolyte consisting of 1 mol/l of $LiPF_6$ in a mixture of ethylene carbonate and diethyl carbonate (1:1). The negative electrode (1) is connected to the negative can (3) through the negative electrode collector (2). The positive electrode (6) is connected to the positive can (8) through the positive electrode collector (7). The battery has a structure to enable charge and discharge as a secondary battery.

The negative electrode (1) is formed of an amorphous or finely crystalline Si film. The Si film is formed by sputtering or CVD on the negative electrode collector (2) made of an electrolytic copper film. The thickness of the Si film is 2 to 10 μm. The Si film on which lithium metal film is put is stored for ten days in an electrolyte which composition is the same as described above to add Li electrochemically.

The positive electrode (6) is formed by a Bi or Sb film. The Bi or Sb film is prepared by sputtering or CVD on an electrolytic copper film. The thickness of the Bi film is 6 μm so as to have almost equal capacity as that of the negative electrode (1). The thickness of the Sb film is 5 μm for the same reasons as Bi film.

1.5 V of a charge ending voltage, and 0 V of a discharge ending voltage are obtained in a battery having the Bi film as the positive electrode (6). 1.0 V of a charge ending voltage, and 0 V of a discharge ending voltage are obtained in a battery having the Sb film as the positive electrode (6).

A lithium secondary battery of the present invention has a great capacity density per volume and weight because a Bi film or Sb film which has a large capacity density is used as a positive electrode, and Si film which has a large capacity density is used as a negative electrode.

Bi, Sb or Si film are used alone as an electrode in the examples explained above. However, an alloy including these elements and other elements can be used as long as the object of the invention is satisfied, i.e., unless a capacity density is reduced dramatically.

Advantages of the Invention

A lithium battery of the present invention has a large capacity density per both volume and weight because Li—Bi alloy or Li—Sb alloy is used as an active positive electrode material.

What is claimed is:

1. A lithium secondary battery comprising a positive electrode, a negative electrode and a non-aqueous electrolyte, wherein the positive electrode contains Li—Bi alloy or Li—Sb alloy as a positive electrode active material.

2. A lithium secondary battery according to claim 1, wherein said negative electrode contains Li—Si alloy or Li—Ge alloy as a negative electrode active material.

3. A lithium secondary battery according to claim 2, wherein said negative electrode active material is Li—Si alloy.

4. A lithium secondary battery according to claim 1, wherein said Li—Bi alloy or Li—Sb alloy contains at least one other element.

5. A lithium secondary battery according to claim 2, wherein said Li—Si alloy or Li—Ge alloy contains at least one other element.

6. A lithium secondary battery according to claim 1, wherein said Li—Bi alloy or Li—Sb alloy is prepared by electrochemical addition of lithium to a Bi film or Sb film which is formed on a positive electrode collector.

7. A lithium secondary battery according to claim 2, wherein said Li—Bi alloy or Li—Sb alloy is prepared by electrochemical addition of lithium to a Bi film or Sb film which is formed on a positive electrode collector.

8. A lithium secondary battery according to claim 3, wherein said Li—Bi alloy or Li—Sb alloy is prepared by electrochemical addition of lithium to a Bi film or Sb film which is formed on a positive electrode collector.

9. A lithium secondary battery according to claim 6, wherein addition of lithium to the film is performed by a discharge reaction after the battery is assembled.

10. A lithium secondary battery according to claim 7, wherein addition of lithium to the film is performed by a discharge reaction after the battery is assembled.

11. A lithium secondary battery according to claim 8, wherein addition of lithium to the film is performed by a discharge reaction after the battery is assembled.

12. A lithium secondary battery according to claim 2, wherein said Li—Si alloy or Li—Ge alloy is prepared by electrochemical addition of lithium to a Si film or Ge film which is formed on a negative electrode collector.

13. A lithium secondary battery according to claim 3, wherein said Li—Si alloy is prepared by electrochemical addition of lithium to a Si film which is formed on a negative electrode collector.

14. A lithium secondary battery according to claim 12, wherein addition of lithium to the film is performed prior to assembly of the battery.

15. A lithium secondary battery according to claim 13, wherein addition of lithium to the film is performed prior to assembly of the battery.

\* \* \* \* \*